(12) United States Patent
Chen (10) Patent No.: US 10,017,038 B2
(45) Date of Patent: Jul. 10, 2018

(54) TURBOJET AUTOMOBILE

(71) Applicant: Xiaohui Chen, Zhejiang (CN)

(72) Inventor: Xiaohui Chen, Zhejiang (CN)

(*) Notice: Subject to any disclaimer, the term of this patent is extended or adjusted under 35 U.S.C. 154(b) by 0 days.

(21) Appl. No.: 15/656,053

(22) Filed: Jul. 21, 2017

(65) Prior Publication Data
US 2018/0009304 A1    Jan. 11, 2018

Related U.S. Application Data

(63) Continuation of application No. PCT/CN2016/000366, filed on Jul. 5, 2016.

(30) Foreign Application Priority Data

Aug. 5, 2015    (CN) .......................... 2015 1 0483052

(51) Int. Cl.
| | |
|---|---|
| *F02C 1/00* | (2006.01) |
| *B60K 3/04* | (2006.01) |
| *F04B 41/02* | (2006.01) |
| *F01D 15/02* | (2006.01) |
| *F04B 35/01* | (2006.01) |

(52) U.S. Cl.
CPC .............. *B60K 3/04* (2013.01); *F01D 15/02* (2013.01); *F04B 35/01* (2013.01); *F04B 41/02* (2013.01); *F05D 2220/30* (2013.01)

(58) Field of Classification Search
CPC ..... F02C 7/005; F02C 5/00; F02C 1/00; F01B 21/04
See application file for complete search history.

(56) References Cited

U.S. PATENT DOCUMENTS

| | | | |
|---|---|---|---|
| 8,528,312 B1* | 9/2013 | Shammoh | B64D 33/02 415/121.2 |
| 2003/0079463 A1* | 5/2003 | McKinney | F02K 9/78 60/204 |
| 2005/0257575 A1* | 11/2005 | Kang | D06F 37/203 68/3 SS |

* cited by examiner

*Primary Examiner* — John Daniel Walters
*Assistant Examiner* — James J Triggs
(74) *Attorney, Agent, or Firm* — Wayne & Ken, LLC; Tony Hom (57) ABSTRACT

The present invention discloses a turbojet automobile, comprising an air storage bottle in a superhigh-pressure air producing and sealing device, wheels, a chassis, a lever braking device, a spray pipe, a turbine wheel and a turbine shaft. The superhigh-pressure air producing and sealing device comprises a frame, an air compressor arranged at an upper part of the frame, and the air storage bottle arranged at a lower part of the frame; a left part of the spray pipe is fixedly connected with a right part of the chassis; a bottle body is placed on the chassis; the turbine wheel and the turbine shaft are arranged in the spray pipe; the turbine shaft can drive the wheels to rotate together when rotating; and an air outlet pipe of the bottle body is connected with the spray pipe.

5 Claims, 5 Drawing Sheets

TURBOJET AUTOMOBILE

TECHNICAL FIELD

The present invention relates to an automobile manufacturing technology.

BACKGROUND

An automobile refers to a transportation tool using fuels such as gasoline, diesel oil or natural gas and the like as energy sources and driven by power of an engine. The automobile is generally provided with four or more wheels and may drive on land independently of a track or stringing.

SUMMARY

The purpose of the present invention is to provide a turbojet automobile so as to solve the technical defects of excessively complex structure, high manufacturing cost and serious environmental pollution in a traditional automobile.

To solve the above technical problems, a technical solution adopted by the present invention is that:

The turbojet automobile comprises an air storage bottle in a superhigh-pressure air producing and sealing device, wheels, a chassis, a first lever braking device, a spray pipe, a turbine wheel and a turbine shaft.

The superhigh-pressure air producing and sealing device comprises a frame, an air compressor arranged at an upper part of the frame and an air storage bottle arranged at a lower part of the frame. The air compressor comprises an inner shell and an outer shell. The inner shell comprises an upper pressing plate and a double-layer cylindrical plate. The double-layer cylindrical plate comprises a first-layer cylindrical plate and a second-layer cylindrical plate; the first-layer cylindrical plate is cylindrical and has a caliber less than a width of the upper pressing plate; the second-layer cylindrical plate is also cylindrical and has a caliber less than that of the first-layer cylindrical plate; the second-layer cylindrical plate is sleeved in the first-layer cylindrical plate; a top of the first-layer cylindrical plate of the double-layer cylindrical plate is fixedly connected with a bottom of the upper pressing plate; and a top of the second-layer cylindrical plate is also fixedly connected with the bottom of the upper pressing plate. A first air inlet is formed in the upper part of the outer shell, and part of the bottom of the outer shell protrudes downwards to form a double-layer cylindrical plate slot corresponding to the double-layer cylindrical plate. The double-layer cylindrical plate slot comprises a first-layer cylindrical plate slot and a second-layer cylindrical plate slot. The first-layer cylindrical plate can move up and down in the first-layer cylindrical plate slot; the second-layer cylindrical plate can move up and down in the second-layer cylindrical plate slot; a first air outlet is also formed in the bottom of the outer shell; the inner shell is arranged in the outer shell, and a side surface of the upper pressing plate is bonded with an inner wall of the outer shell; the first-layer cylindrical plate, part of the upper pressing plate and part of the outer shell are encircled to form a first auxiliary air chamber; part of the bottom of the outer shell, the first-layer cylindrical plate, the second-layer cylindrical plate and part of the upper pressing plate are encircled to form a second auxiliary air chamber; and the second-layer cylindrical plate, part of the bottom of the outer shell and part of the upper pressing plate are encircled to form a main air chamber.

The air storage bottle comprises a bottle body; a second air inlet communicated with the first air outlet is formed in the top of the bottle body; first threads are formed in the rim of the second air inlet; a threaded cover is arranged at the second air inlet; the interior of the threaded cover is hollowed to form an air outlet pipe, and a second air outlet communicated with the air outlet pipe is formed in the lower end of the left part of the threaded cover; third gears are arranged on an outer wall of an upper part of the threaded cover and are fixed to the outer wall of the upper part of the threaded cover; threads matched with the first threads formed in the rim of the second air inlet are formed in the outer wall of the lower part of the threaded cover; a second air inlet cover is also arranged below the threaded cover, and a longitudinal section of the second air inlet cover is in a U shape; the second air inlet cover is arranged in the bottle body; a first groove is formed in the upper part of part of the bottle body at the periphery of the second air inlet, and a bottom end of the first air outlet is arranged in first grooves; second grooves are formed in the upper part of part of the bottle body near the first grooves; and second threads are formed in the second grooves.

A first bracket is arranged at an upper part of the frame, and second brackets are arranged on a left side and a right side of the middle part of the frame respectively. The first bracket is provided with a first driving device used for driving the upper pressing plate to move up and down; and the second brackets are provided with second driving devices for driving the whole air compressor to move up and down.

The first lever braking device comprises a third motor, a first bevel gear, a first vertical rod, a first lever, a second vertical rod and a second bevel gear. A third rack is arranged on the first vertical rod and fixed to the first vertical rod; a fourth rack is arranged on the second vertical rod and fixed to the second vertical rod; the top of the first vertical rod is fixedly connected with the bottom end of the right part of the first lever, and top of the second vertical rod is fixedly connected with the bottom end of the left part of the first lever. A third bracket, a fourth bracket, a fifth bracket and a sixth bracket are arranged on the chassis. The third bracket, the fourth bracket, the fifth bracket and the sixth bracket are fixed to the chassis. The third motor is arranged on the third bracket, the first bevel gear is arranged on the fourth bracket, the first level is arranged on the fifth bracket, and the second bevel gear is arranged on the sixth bracket. The third motor is provided with a fourth gear; the first bevel gear is engaged with both the fourth gear on the third motor and the third rack on the first vertical rod; and the second bevel gear is engaged with both the fourth rack on the second vertical rod and the third gear on the threaded cover.

A seventh bracket is arranged at the right upper part of the frame. The first driving device comprises a first motor arranged on the first bracket, a first gear arranged on the first bracket, a vertically arranged first dowel bar with a bottom end fixed to the upper pressing plate, a first rack arranged on the first dowel bar, and a second lever braking device. The second lever braking device comprises a third vertical rod, a second lever, a fourth vertical rod, a fifth rack and a sixth rack. The second lever is arranged on a seventh bracket; the fifth rack is fixed to the third vertical rod, and the sixth rack is fixed to the fourth vertical rod; the top of the third vertical rod is fixedly connected with a bottom end of a left part of the second lever, and the top of the fourth vertical rod is fixedly connected with a bottom end of a right part of the second lever; the first gear is engaged with both the first rack and the fifth rack; and the first motor is provided with a fourth gear, and the fourth gear is engaged with the sixth rack.

Each second driving device comprises the second motor arranged on the corresponding second bracket, the second gear arranged on the corresponding second bracket and driven by the corresponding second motor, an "L"-shaped second dowel bar arranged on the outer wall of the outer shell and a second rack arranged on the corresponding second dowel bar. Each second gear is engaged with the corresponding second rack; the second motors can drive the second gears to rotate; the second driving devices have the action of pushing the whole air compressor upwards to enable the bottom end of the first air outlet of the air compressor to disengage from the first grooves after air is compressed by the air compressor; and the second brackets on a left side and a right side of the middle part of the frame are respectively provided with a second driving device.

A second air inlet cover support used for supporting the second air inlet cover is arranged at the second air inlet cover. The top of the second air inlet cover support is fixedly connected with the bottom of part of the bottle body at the periphery of the second air inlet; the second air inlet cover is arranged in the second air inlet cover support; a cover slot matched with part of the upper part of the second air inlet cover is formed in the upper part of the second air inlet cover support; and part of the upper part of the second air inlet cover can move up and down in the cover slot. A third air inlet communicated with the interior of the bottle body is formed in a right part of the second air inlet cover support; and an air flue communicated with the interior of the bottle body is formed in the bottom of the second air inlet cover support.

The left part of the spray pipe is fixedly connected with the right part of the chassis. The bottle body is placed on the chassis. The turbine wheel and the turbine shaft are arranged in the spray pipe, and the turbine shaft can drive the wheels to rotate together when rotating. The air outlet pipe of the bottle body is connected with the spray pipe.

DETAILED DESCRIPTION

Specific embodiments of the present invention will be further described below in combination with drawings.

Figure 5:
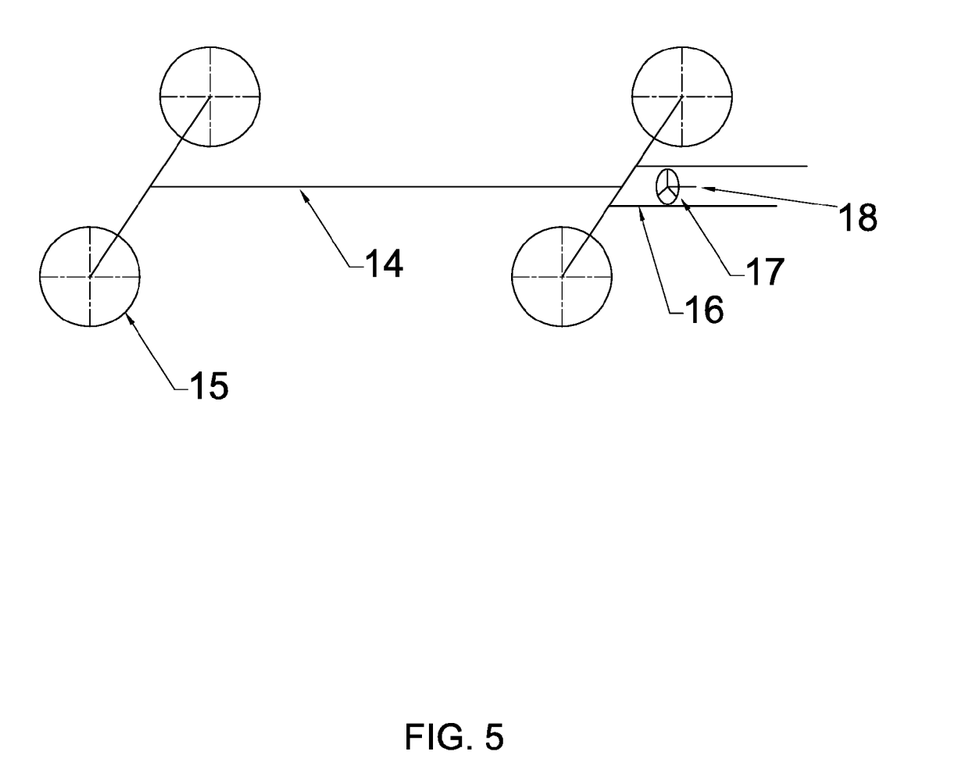
FIG. 5 is a structural schematic diagram of part of a turbojet automobile.

The turbojet automobile comprises an air storage bottle in a superhigh-pressure air producing and sealing device, wheels 15, a chassis 14, a first lever braking device, a spray pipe 16, a turbine 17 and a turbine shaft 18.

Figure 1:
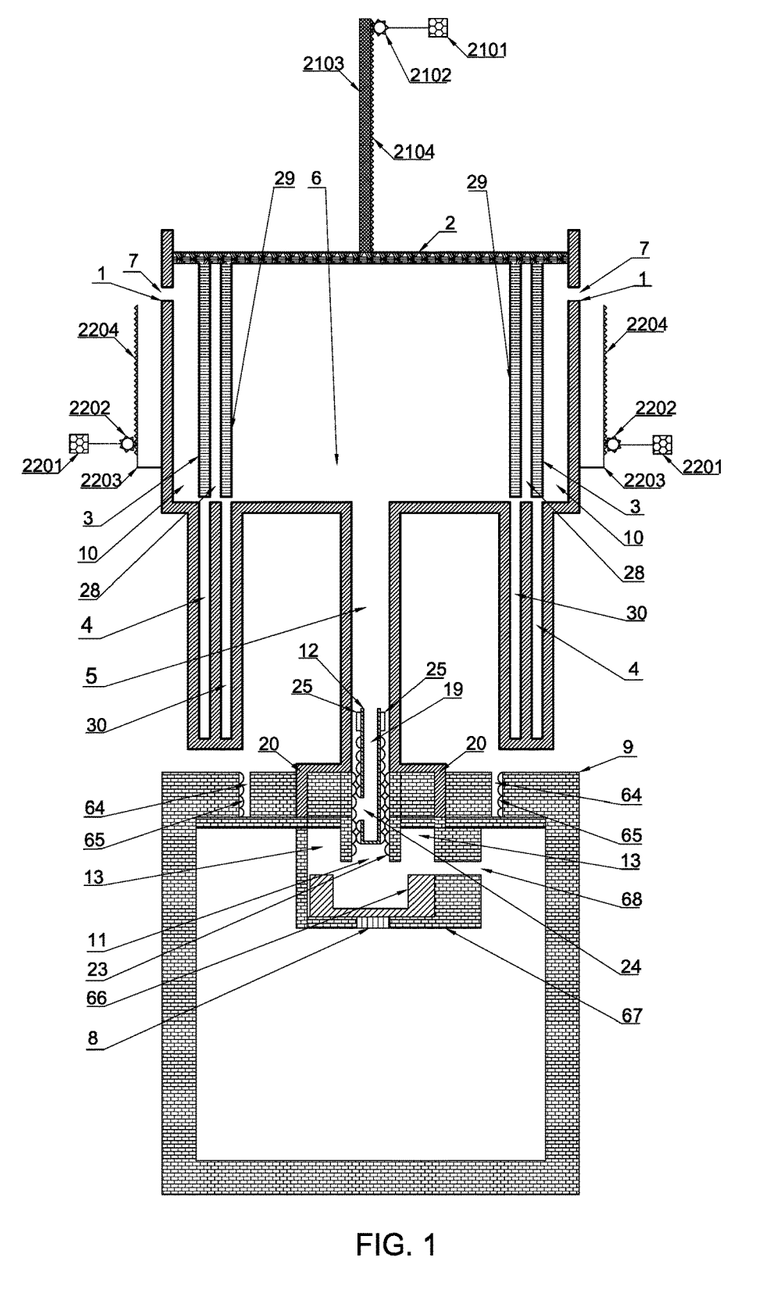
FIG. 1 is a structural schematic diagram of part of a superhigh-pressure gas producing and sealing device.

The superhigh-pressure air producing and sealing device (as shown in FIG. 1) comprises a frame (not shown in the figure), an air compressor arranged at an upper part of the frame and an air storage bottle arranged at a lower part of the frame. The air compressor comprises an inner shell and an outer shell 1. The inner shell comprises an upper pressing plate 2 and a double-layer cylindrical plate. The double-layer cylindrical plate comprises a first-layer cylindrical plate 3 and a second-layer cylindrical plate 29. The first-layer cylindrical plate 3 is cylindrical and has a caliber less than a width of the upper pressing plate 2; the second-layer cylindrical plate 29 is also cylindrical and has a caliber less than that of the first-layer cylindrical plate 3; the second-layer cylindrical plate 29 is sleeved in the first-layer cylindrical plate 3; a top of the first-layer cylindrical plate 3 of the double-layer cylindrical plate is fixedly connected with the bottom of the upper pressing plate 2; the top of the second-layer cylindrical plate 29 is also fixedly connected with the bottom of the upper pressing plate 2; a first air inlet 7 is formed in the upper part of the outer shell 1, and part of the bottom of the outer shell 1 protrudes downwards to form a double-layer cylindrical plate slot corresponding to the double-layer cylindrical plate; the double-layer cylindrical plate slot comprises a first-layer cylindrical plate slot 4 and a second-layer cylindrical plate slot 30; the first-layer cylindrical plate 3 can move up and down in the first-layer cylindrical plate slot 4; and the second-layer cylindrical plate 29 can move up and down in the second-layer cylindrical plate slot 30. A first air outlet 5 is also formed in the bottom of the outer shell 1; the inner shell is arranged in the outer shell 1, and a side surface of the upper pressing plate 2 is bonded with an inner wall of the outer shell 1; the first-layer cylindrical plate 3, part of the upper pressing plate 2 and part of the outer shell 1 are encircled to form a first auxiliary air chamber 10; part of the bottom of the outer shell 1, the first-layer cylindrical plate 3, the second-layer cylindrical plate 29 and part of the upper pressing plate 2 are encircled to form a second auxiliary air chamber 28; and the second-layer cylindrical plate 29, part of the bottom of the outer shell 1 and part of the upper pressing plate 2 are encircled to form a main air chamber 6.

Figure 2:
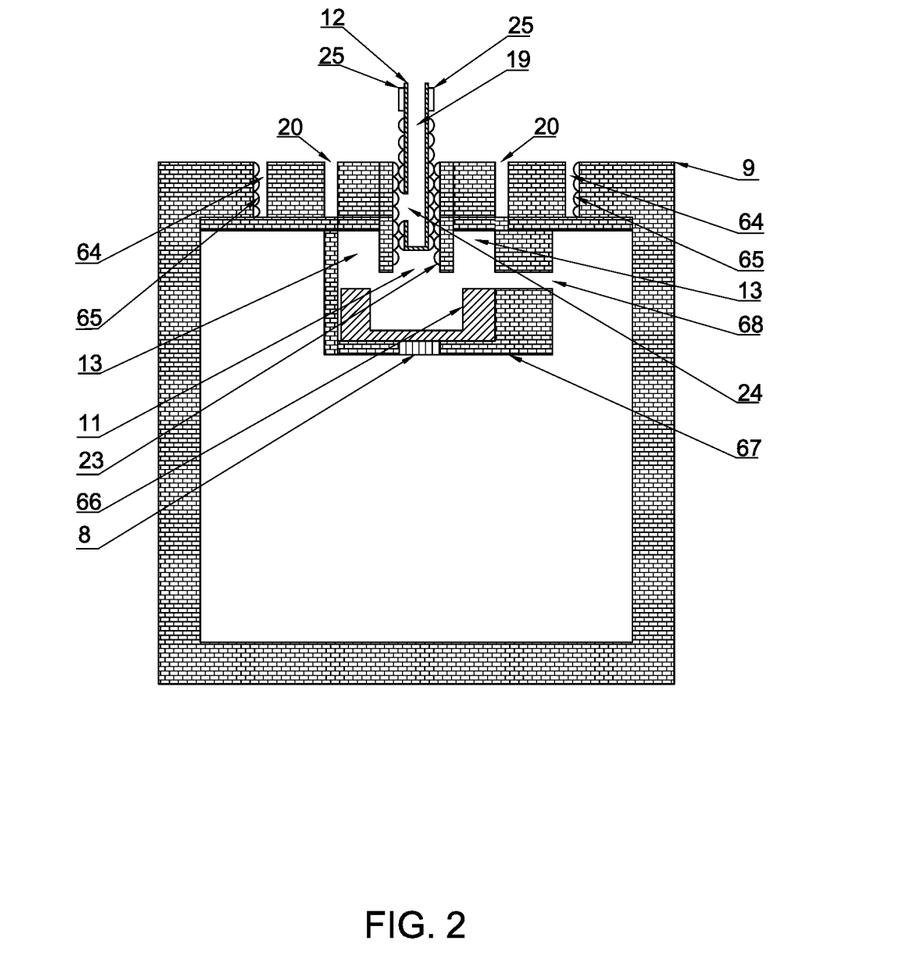
FIG. 2 is a structural schematic diagram of an air storage bottle.

The air storage bottle comprises a bottle body 9 (as shown in FIG. 2). A second air inlet 11 communicated with the first air outlet 5 is formed in the top of the bottle body 9; first threads 23 are formed in the rim of the second air inlet 11; a threaded cover 12 is arranged at the second air inlet 11; the interior of the threaded cover 12 is hollowed to form an air outlet pipe 19, and a second air outlet 24 communicated with the air outlet pipe 19 is formed in the lower end of the left part of the threaded cover 12; third gears 25 are arranged on the outer wall of the upper part of the threaded cover 12 and are fixed to the outer wall of the upper part of the threaded cover 12; threads matched with the first threads 23 formed in the rim of the second air inlet 11 are formed in the outer wall of the lower part of the threaded cover 12; a second air inlet cover 38 is also arranged below the threaded cover 12, and a longitudinal section of the second air inlet cover 38 is in a U shape; the second air inlet cover 38 is arranged in the bottle body 9; a first groove 20 is formed in the upper part of part of the bottle body 9 at the periphery of the second air inlet 11, and the bottom end of the first air outlet 5 is arranged in first groove 20; second grooves 36 are formed in the upper part of part of the bottle body 9 near the corresponding first grooves 20, and second threads 37 are formed in the second grooves 36.

A first bracket (belonging to the prior art, and not shown in the figure) is arranged at the upper part of the frame, and second brackets are arranged on a left side and a right side of the middle part of the frame respectively. The first bracket is provided with a first driving device used for driving the upper pressing plate 2 to move up and down; and the second brackets are provided with second driving devices for driving the whole air compressor to move up and down.

Figure 3:
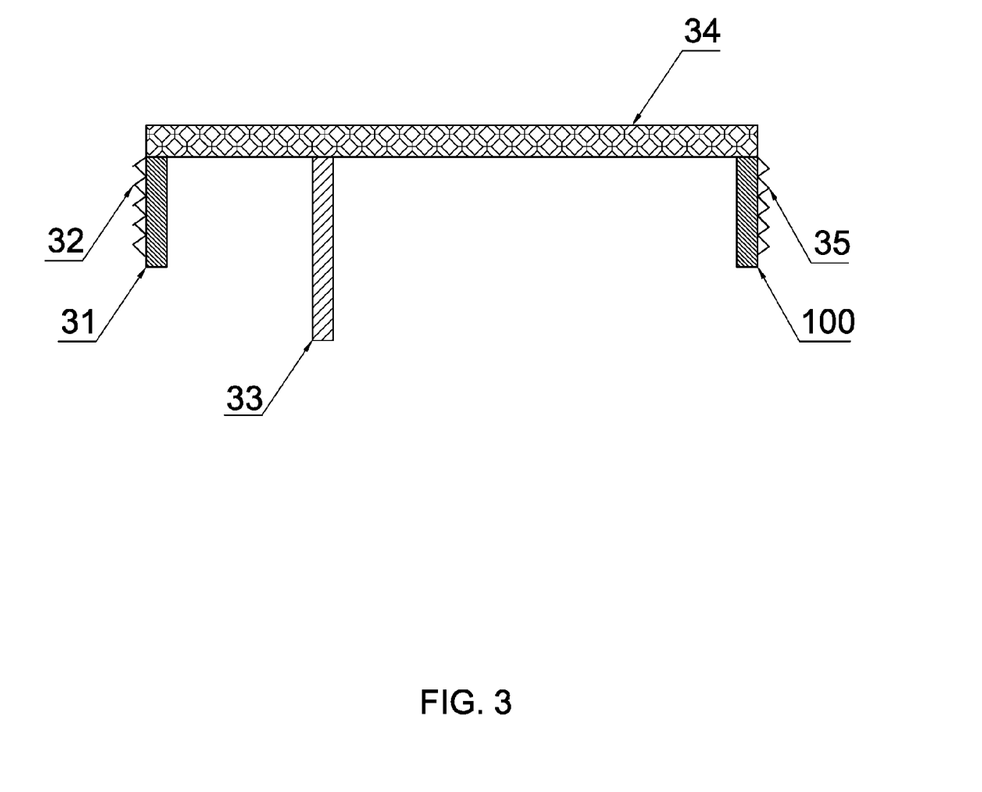
FIG. 3 is a structural schematic diagram of part of a first lever braking device.

The first lever braking device comprises a third motor 26, a first bevel gear 27, a first vertical rod 36, a first lever 34, a second vertical rod 31 and a second bevel gear 41 (as shown in FIG. 3). A third rack 35 is arranged on the first vertical rod 36 and fixed to the first vertical rod 36. A fourth rack 32 is arranged on the second vertical rod 31 and fixed to the second vertical rod 31. A top of the first vertical rod 36 is fixedly connected with a bottom end of a right part of the first lever 34, and a top of the second vertical rod 31 is fixedly connected with a bottom end of a left part of the first lever 34. A third bracket, a fourth bracket, a fifth bracket and a sixth bracket are arranged on the chassis 14. The third bracket, the fourth bracket, the fifth bracket and the sixth bracket are fixed to the chassis 14. The third motor 26 is arranged on the third bracket, the first bevel gear 27 is arranged on the fourth bracket, the first level 34 is arranged on the fifth bracket 33, and the second bevel gear 41 is arranged on the sixth bracket. The third motor 26 is provided with a fourth gear 42; the first bevel gear 27 is engaged with both the fourth gear 42 on the third motor 26 and the third rack 35 on the first vertical rod 36; and the second bevel gear 41 is engaged with both the fourth rack 32 on the second vertical rod 31 and the third gear 25 on the threaded cover 12.

Figure 4:
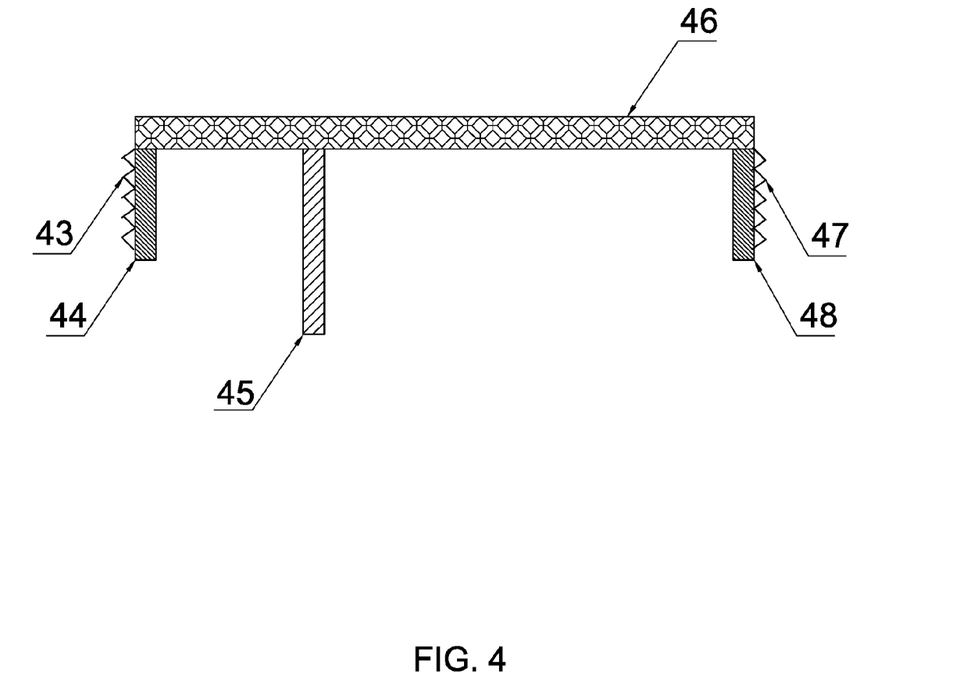
FIG. 4 is a structural schematic diagram of a second lever braking device.

A seventh bracket 45 is arranged at a right upper part of the frame; the first driving device comprises a first motor 2101 arranged on the first bracket, a first gear 2102 arranged on the first bracket, a vertically arranged first dowel bar 2103 with a bottom end fixed to the upper pressing plate 2, a first rack 2104 arranged on the first dowel bar 2103, and a second lever braking device. The second lever braking device comprises a third vertical rod 44, a second lever 46, a fourth vertical rod 48, a fifth rack 43 and a sixth rack 47. The second lever 46 is arranged on a seventh bracket 45; the fifth rack 43 is fixed to the third vertical rod 44, and the sixth rack 47 is fixed to the fourth vertical rod 48; a top of the third vertical rod 44 is fixedly connected with the bottom end of the left part of the second lever 46, and the top of the fourth vertical rod 48 is fixedly connected with the bottom end of the right part of the second lever 46; the first gear 2102 is engaged with both the first rack 2104 and the fifth rack 43; and the first motor 2101 is provided with a fourth gear 49, and the fourth gear 49 is engaged with the sixth rack 47.

Each second driving device comprises a second motor 2201 arranged on the second bracket, a second gear 2202 arranged on the second bracket and driven by the second motor 2201, an "L"-shaped second dowel bar 2203 arranged on an outer wall of the outer shell 1, and a second rack 2204 arranged on the second dowel bar 2203. Each second gear 2202 is engaged with the second rack 2204. The second motors 2201 can drive the second gears 2202 to rotate; the second driving devices have the action of pushing the whole air compressor upwards to enable the bottom end of the first air outlet 5 of the air compressor to disengage from the first grooves 20 after air is compressed by the air compressor; and the second brackets on the left side and the right side of the middle part of the frame are respectively provided with a second driving device.

A second air inlet cover support 39 used for supporting the second air inlet cover 38 is arranged at the second air inlet cover 38; the top of the second air inlet cover support 39 is fixedly connected with the bottom of part of the bottle body 9 at the periphery of the second air inlet 11; the second air inlet cover 38 is arranged in the second air inlet cover support 39, a cover slot 13 matched with part of the upper part of the second air inlet cover 38 is formed in the upper part of the second air inlet cover support 39, and part of the upper part of the second air inlet cover 38 can move up and down in the cover slot 13; a third air inlet 40 communicated with the interior of the bottle body 9 is formed in the right part of the second air inlet cover support 39; and an air flue 8 communicated with the interior of the bottle body 9 is formed in the bottom of the second air inlet cover support 39.

The left part of the spray pipe 16 is fixedly connected with the right part of the chassis 14 (as shown in FIG. 5). The bottle body 9 is placed on the chassis 14. The turbine wheel 17 and the turbine shaft 18 are arranged in the spray pipe 16, and the turbine shaft 18 can drive the wheels 15 to rotate together when rotating. The air outlet pipe 19 of the bottle body 9 is connected with the spray pipe 16.

A specific operation process of the present invention is as follows:

1. The threaded cover 12 is screwed downwards so as to enable the second air outlet 24 to be communicated with the bottle body 9.

2. External air sequentially enters the first auxiliary air chamber 10, the first-layer cylindrical plate slot 4, the second auxiliary air chamber 28, the second-layer cylindrical plate slot 30 and the main air chamber 6 from the first air inlet 7.

3. After the first motor 2101 is started, the first dowel bar 2103 is driven to move down, and the upper pressing plate 2 also moves down and compresses gas in the main air chamber 6. In the compression process, the pressure intensity of the gas in the first auxiliary air chamber 10, the pressure intensity of the gas in the first-layer cylindrical plate slot 4, the pressure intensity of the gas in the second auxiliary air chamber 28, the pressure intensity of the gas in the second-layer cylindrical plate slot 30 and the pressure intensity of the gas in the main air chamber 6 are progressively increased, so that leakage of the gas in the main air chamber 6 may be reduced. The compressed gas is sprayed from the first air outlet 5 and sequentially enters the second air inlet 11, the third air inlet 40 and the bottle body 9.

4. After the second motor 2201 is started, the second dowel bar 2203 is driven to move up and pushes the whole air compressor to move up, so that the bottom end of the first air outlet 5 of the air compressor disengages from the grooves 20. In the process, due to the pushing action of the gas in the air flue 8 to the second air inlet cover 38, the second air inlet cover 38 moves up and enters the cover slot 13.

5. The threaded cover 12 is screwed upwards so as to block the gas in the bottle body 9 from escaping from the second air outlet 24.

6. The air storage bottle is placed on the chassis 14 so as to enable the second bevel gear 41 to be engaged with the third gears 25 on the threaded cover 12.

7. When high-pressure gas in the bottle body 9 needs to be used for pushing the wheels to move forwards, after the third motor 26 is started, the threaded cover 12 is screwed by virtue of the first lever braking device, and thus the second air outlet 24 is opened or closed; and when the second air outlet 24 is opened, the high-pressure air in the bottle body 9 is sprayed from the second air outlet 24 and pushes the turbine wheel 17 and the turbine shaft 18 to rotate, and the turbine shaft 18 may drive the wheels 15 to rotate together.

Part of the above description not particularly explained belongs to the prior art or can be realized through the prior art. Any equivalent variation and modification made in accordance with contents of the scope of the application patent of the present invention shall belong to the technical field of the present invention.

What is claimed is:

1. A turbojet automobile, comprising an air storage bottle in a superhigh-pressure air producing and sealing device, wheels (15), a chassis (14), a lever braking device, a spray pipe (16), a turbine wheel (17) and a turbine shaft (18), wherein the superhigh-pressure air producing and sealing device comprises a frame, an air compressor arranged at an upper part of the frame and the air storage bottle arranged at a lower part of the frame; the air compressor comprises an inner shell and an outer shell (1); the inner shell comprises an upper pressing plate (2) and a double-layer cylindrical plate; the double-layer cylindrical plate comprises a first-layer cylindrical plate (3) and a second-layer cylindrical plate (29); the first-layer cylindrical plate (3) is cylindrical and has a caliber less than a width of the upper pressing plate (2); the second-layer cylindrical plate (29) is also cylindrical and has a caliber less than a caliber of the first-layer cylindrical plate (3); the second-layer cylindrical plate (29) is sleeved in the first-layer cylindrical plate (3); a top of the first-layer cylindrical plate (3) of the double-layer cylindrical plate is fixedly connected with a bottom of the upper pressing plate (2); a top of the second-layer cylindrical plate (29) is also fixedly connected with a bottom of the upper pressing plate (2); a first air inlet (7) is formed in the upper part of the outer shell (1), and part of the bottom of the outer shell (1) protrudes downwards to form a double-layer cylindrical plate slot corresponding to the double-layer cylindrical plate; the double-layer cylindrical plate slot comprises a first-layer cylindrical plate slot (4) and a second-layer cylindrical plate slot (30); the first-layer cylindrical plate (3) moves up and down in the first-layer cylindrical plate slot (4); the second-layer cylindrical plate (29) can move up and down in the second-layer cylindrical plate slot (30); a first air outlet (5) is also formed in the bottom of the outer shell (1); the inner shell is arranged in the outer shell (1), and a side surface of the upper pressing plate (2) is bonded with an inner wall of the outer shell (1); the first-layer cylindrical plate (3), part of the upper pressing plate (2) and part of the outer shell (1) are encircled to form a first auxiliary air chamber (10); part of the bottom of the outer shell (1), the first-layer cylindrical plate (3), the second-layer cylindrical plate (29) and part of the upper pressing plate (2) are encircled to form a second auxiliary air chamber (28); and the second-layer cylindrical plate (29), part of the bottom of the outer shell (1) and part of the upper pressing plate (2) are encircled to form a main air chamber (6);

the air storage bottle comprises a bottle body (9); a second air inlet (11) communicated with the first air outlet (5) is formed in the top of the bottle body (9); first threads (23) are formed in a rim of the second air inlet (11); a threaded cover (12) is arranged at the second air inlet (11); the interior of the threaded cover (12) is hollowed to form an air outlet pipe (19), and a second air outlet (24) communicated with the air outlet pipe (19) is formed in a lower end of a left part of the threaded cover (12); third gears (25) are arranged on an outer wall of an upper part of the threaded cover (12) and are fixed to the outer wall of the upper part of the threaded cover (12); threads matched with the first threads (23) formed in the rim of the second air inlet (11) are formed in the outer wall of the lower part of the threaded cover (12); a second air inlet cover (38) is also arranged below the threaded cover (12), and a longitudinal section of the second air inlet cover (38) is in a U shape; the second air inlet cover (38) is arranged in the bottle body (9); a first groove (20) is formed in the upper part of part of the bottle body (9) at the periphery of the second air inlet (11), and a bottom end of the first air outlet (5) is arranged in first grooves (20); second grooves (36) are formed in the upper part of part of the bottle body (9) near the first grooves (20); and second threads (37) are formed in the second grooves (36);

a first bracket is arranged at the upper part of the frame, and second brackets are arranged on the left side and the right side of a middle part of the frame respectively; a first driving device used for driving the upper pressing plate (2) to move up and down is arranged on the first bracket; and second driving devices for driving the whole air compressor to move up and down are arranged on the second brackets;

the first lever braking device comprises a third motor (26), a first bevel gear (27), a first vertical rod (36), a first lever (34), a second vertical rod (31) and a second bevel gear (41); a third rack (35) is arranged on the first vertical rod (36) and fixed to the first vertical rod (36); a fourth rack (32) is arranged on the second vertical rod (31) and fixed to the second vertical rod (31); a top of the first vertical rod (36) is fixedly connected with a bottom end of a right part of the first lever (34), and a top of the second vertical rod (31) is fixedly connected with a bottom end of a left part of the first lever (34); a third bracket, a fourth bracket, a fifth bracket and a sixth bracket are arranged on the chassis (14); the third bracket, the fourth bracket, the fifth bracket and the sixth bracket are fixed to the chassis (14); the third motor (26) is arranged on the third bracket, the first bevel gear (27) is arranged on the fourth bracket, the first level (34) is arranged on the fifth bracket (33), and the second bevel gear (41) is arranged on the sixth bracket; the third motor (26) is provided with a fourth gear (42); the first bevel gear (27) is engaged with both the fourth gear (42) on the third motor (26) and the third rack (35) on the first vertical rod (36); and the second bevel gear (41) is engaged with both the fourth rack (32) on the second vertical rod (32) and the third gear (25) on the threaded cover (12).

2. The turbojet automobile according to claim 1, wherein a seventh bracket (45) is arranged at the right upper part of the frame; the first driving device comprises a first motor (2101) arranged on the first bracket, a first gear (2102) arranged on the first bracket, a vertically arranged first dowel bar (2103) with a bottom end fixed to the upper pressing plate (2), a first rack (2104) arranged on the first dowel bar (2103) and a second lever braking device; the second lever braking device comprises a third vertical rod (44), a second lever (46), a fourth vertical rod (48), a fifth rack (43) and a sixth rack (47); the second lever (46) is arranged on a seventh bracket (45); the fifth rack (43) is fixed to the third vertical rod (44), and the sixth rack (47) is fixed to the fourth vertical rod (48); the top of the third vertical rod (44) is fixedly connected with the bottom end of the left part of the second lever (46), and the top of the fourth vertical rod (48) is fixedly connected with the bottom end of the right part of the second lever (46); the first gear (2102) is engaged with both the first rack (2104) and the fifth rack (43); and the first motor (2101) is provided with a fourth gear (49), and the fourth gear (49) is engaged with the sixth rack (47).

3. The turbojet automobile according to claim 1, wherein each second driving device comprises the second motor (2201) arranged on the second bracket, the second gear (2202) arranged on the second bracket and driven by the second motor (2201), an "L"-shaped second dowel bar (2203) arranged on an outer wall of the outer shell (1), and a second rack (2204) arranged on the second dowel bar (2203); each second gear (2202) is engaged with the second rack (2204); the second motors (2201) drives the second gears (2202) to rotate; the second driving devices have the action of pushing the whole air compressor upwards to enable the bottom end of the first air outlet (5) of the air compressor to disengage from the first grooves (20) after air is compressed by the air compressor; and the second brackets on the left side and the right side of the middle part of the frame are respectively provided with the second driving devices respectively.

4. The turbojet automobile according to claim 1, wherein a second air inlet cover support (39) used for supporting the second air inlet cover (38) is arranged at the second air inlet cover (38); a top of the second air inlet cover support (39) is fixedly connected with a bottom of part of the bottle body (9) at the periphery of the second air inlet (11); the second air inlet cover (38) is arranged in the second air inlet cover support (39), a cover slot (13) matched with part of the upper part of the second air inlet cover (38) is formed in the upper part of the second air inlet cover support (39), and part of the upper part of the second air inlet cover (38) moves up and down in the cover slot (13); a third air inlet (40) communicated with the interior of the bottle body (9) is formed in the right part of the second air inlet cover support (39); and an air flue (8) communicated with the interior of the bottle body (9) is formed in the bottom of the second air inlet cover support (39).

5. The turbojet automobile according to claim 1, wherein a left part of the spray pipe (16) is fixedly connected with a right part of the chassis (14); the bottle body (9) is placed on the chassis (14); the turbine wheel (17) and the turbine shaft (18) are arranged in the spray pipe (16); the turbine shaft (18) drives the wheels (15) to rotate together when rotating; and the air outlet pipe (19) of the bottle body (19) is connected with the spray pipe (16).

* * * * *